United States Patent
Kuroda

(10) Patent No.: US 8,047,520 B2
(45) Date of Patent: Nov. 1, 2011

(54) MOVABLE ARTICLE COUPLING APPARATUS

(75) Inventor: Takayuki Kuroda, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 1218 days.

(21) Appl. No.: 11/663,492

(22) PCT Filed: Oct. 29, 2004

(86) PCT No.: PCT/JP2004/016123
§ 371 (c)(1),
(2), (4) Date: Mar. 22, 2007

(87) PCT Pub. No.: WO2006/046303
PCT Pub. Date: May 4, 2006

(65) Prior Publication Data
US 2007/0267794 A1  Nov. 22, 2007

(51) Int. Cl.
*B23Q 3/00* (2006.01)
(52) U.S. Cl. .................................. 269/309
(58) Field of Classification Search ........... 269/309, 269/77, 25, 74, 310; 279/133
See application file for complete search history.

(56) References Cited

U.S. PATENT DOCUMENTS

| | | | |
|---|---|---|---|
| 4,534,546 A * | 8/1985 | Cattani | 269/58 |
| 4,855,558 A | 8/1989 | Ramsbro | |
| 5,634,757 A | 6/1997 | Schanz | |
| 6,089,557 A * | 7/2000 | Obrist | 269/309 |
| 6,152,436 A | 11/2000 | Sonderegger et al. | |
| 6,367,814 B1 | 4/2002 | Luescher et al. | |
| 6,527,266 B1 | 3/2003 | Yonezawa et al. | |

FOREIGN PATENT DOCUMENTS

| | | |
|---|---|---|
| JP | 10-058258 | 3/1998 |
| JP | 2001-038562 | 2/2001 |
| JP | 2001-038564 | 2/2001 |

* cited by examiner

*Primary Examiner* — Lee D Wilson
*Assistant Examiner* — Jamal Daniel
(74) *Attorney, Agent, or Firm* — Jordan and Hamburg LLP

(57) ABSTRACT

The coupling apparatus for bringing a pallet 3 (a movable article) near to a base side support 2 from above, positioning it in the horizontal X, Y directions and in the vertical Z direction, and clamping it in a releasable manner comprises a pair of first engaging protrusions 12 and a pair of second engaging protrusions 13 formed on the top surface of the support 2 for positing in the X direction and in the Y direction, respectively; a pair of first movable article side engaging protrusions 32 each abutting the pair of first engaging protrusions 12 on one side and a pair of second movable article side engaging protrusions 33 each abutting the pair of second engaging protrusions 12 on one side; a Z direction positioning mechanism 8 for positioning the pallet 3 relative to the support 2 in the Z direction; and a clamping mechanism 7 for clamping the pallet 3 on the support 2.

8 Claims, 6 Drawing Sheets

MOVABLE ARTICLE COUPLING APPARATUS

TECHNICAL FIELD

The present invention relates to a movable article coupling apparatus for positioning and locking a movable article such as a pallet on a support.

BACKGROUND OF THE RELATED ART

Various coupling systems or coupling apparatuses are in practical use for horizontally and vertically positioning and locking on the table of a machine tool, a pallet (a movable article) to which a work piece to be machined is attached. In such coupling systems, the pallet positioning accuracy largely affects the machining accuracy. Recently, the pallet positioning error is required to be as small as approximately 4 μm.

U.S. Pat. No. 4,855,558 discloses a machining tool electrode holder wherein as a means for positioning the electrode holder for mounting the electrodes relative to the chuck with precision, the electrode holder has four slots in the shape of a cross and the chuck has four rails (projections) to be engaged with the four slots so that the four rails are engaged with the four slots for positioning them. Recesses are formed on either wall near the slot opening and a pair of elastically deformable tongue-shaped parts is formed on the walls. Elastic deformation of the tongue-shaped parts serves to absorb manufacturing errors of the slots or rails.

U.S. Pat. No. 5,634,757 discloses a coupling apparatus for tools or work pieces wherein the upper holder has four projections (inverted trapezoid in cross-section) in the shape of a cross on the bottom surface, a work piece or tool to be coupled to the holder has four recesses (inverted trapezoid in cross-section) with which the four projections are engaged on the top surface. The projections have flat slots on the wall near the tip. The holder is brought near to the work piece so that the four projections are engaged with the four recesses, the coupling bolts are tightened, and the walls are elastically deformed through the slots, whereby the bottom surface of the holder abuts against the top surface of the work piece or tool. In this way, the work piece or tool is positioned horizontally and vertically (in the X, Y, Z directions) relative to the holder and coupled to it by the bolts. The slot serves to tolerate elastic deformation of the wall near the projection, thereby absorbing manufacturing errors of the recesses or projections.

U.S. Pat. No. 6,152,436 discloses a machining tool coupling apparatus wherein a square base has on the top surface four cams arranged in the shape of a cross in the middle of the four sides of a square framing wall and the pallet has on the bottom surface four engaging grooves to be engaged with the four cams. The four cams are engaged with the four engaging grooves so that the pallet is positioned horizontally (in the X, Y directions) relative to the base. For the vertical positioning (in the Z direction), the base has four seats in the four corners of the base framing wall. The bottom surface of the pallet rests on the seats to position it in the Z direction.

The cams on the framing wall have a slit near the bottom, through which the elastic wall near the bottom of the cam can be elastically deformed. The ball-type clamping mechanism equipped in the center of the base absorbs manufacturing errors of the cams, engaging grooves, or seats through elastic deformation of the elastic wall when the pallet is clamped.
Patent Document 1: U.S. Pat. No. 4,855,558;
Patent Document 2: U.S. Pat. No. 5,634,757; and
Patent Document 3: U.S. Pat. No. 6,152,436.

SUMMARY OF THE INVENTION

Problems to be Solved by the Invention

The apparatuses of Patent Documents 1 to 3 comprise parts elastically deformable in the vertical direction and the elastically deformable parts serve to absorb manufacturing errors. However, for example, when a large cutting force is applied while machining from the cutting tool to a work piece immobilized on the pallet, the elastically deformed part may reduce the pallet positioning accuracy and, accordingly, the work piece machining accuracy.

The apparatuses of Patent Documents 1 to 3 utilize the structure to engage projections with engaging grooves. Cutting dust easily adheres to recesses such as the engaging grooves and it requires enormous labor to clean them. If cutting dust enters between the cam or projection and the engaging groove, the positioning accuracy is extremely lowered. Furthermore, two inclined surfaces formed on either side of each cam or projection are engaged with the engaging surfaces of an engaging groove. Such many engaging points contribute to increased entry of cutting dust.

Furthermore, for polishing the surface of a cam, protrude, or engaging groove, the surface is polished and then the polishing object or tool is shifted. The procedure is repeated several times. Therefore, machining tool error is accumulated each time the polishing object or tool is shifted, thereby limiting the polishing accuracy.

Means for Solving Problems

The present invention presents a movable article coupling apparatus for bringing a movable article near to a base side support from above, positioning it in horizontal X, Y directions and in a vertical Z direction, and releasably clamping it, characterized by comprising a first engaging protrusion and a second engaging protrusion formed on a top surface of the support for positioning in the X direction and in the Y direction, respectively; and a first engaging part and a second engaging part provided on a bottom surface of the movable article and capable of abutting unilateral side surfaces of the first and second engaging protrusions, respectively.

With the first and second engaging parts of the movable article abutting the unilateral side surfaces of the first and second engaging protrusions on the top surface of the support for positioning in the X, Y directions, there is no need for elastically deformable parts that are elastically deformed to absorb manufacturing errors of the engaging protrusions or engaging parts. Therefore, when an external force such as cutting force is applied to the movable article, no elastic deformation occurs and, hence, no reduction in the accuracy of positioning the movable article relative to the support occurs. Consequently, high accuracy of positioning the movable article relative to the support can be maintained.

With the first and second engaging parts abutting the unilateral side surfaces of the first and second engaging protrusions, the number of abutting points is reduced by half compared with the case in which they abut the first and second engaging protrusions on either side. Possible entry of foreign substances such as cutting dust into the abutting points can be significantly reduced and the accuracy of positioning the movable article can be remarkably improved.

With the first and second engaging parts abutting the unilateral side surfaces of the first and second engaging protrusions, the first and second engaging parts can be in the form of an engaging protrusion instead of an engaging groove. Therefore, it is difficult for foreign substances to adhere to and accumulate in the first and second engaging parts. Furthermore, adhered foreign substances are easily cleaned.

The present invention can have the following structures where appropriate.

(a) The first engaging part consists of a first movable article side engaging protrusion and the second engaging part consists of a second movable article side engaging protrusion.

(b) A Z direction positioning mechanism for positioning the movable article relative to the support in the Z direction and a clamping mechanism for clamping the movable article on the support are provided.

(c) The clamping mechanism has a barrel equipped to the support, a cylinder means including a piston rod slidably fitted in the barrel, an annular locking member formed at a bottom end of the movable article and capable of being fitted on the barrel, multiple steel balls radially movably retained in multiple retention holes formed in a peripheral wall of the barrel, and multiple recesses formed on an outer periphery of the piston rod to partially retract the multiple steel balls therein.

(d) The Z direction positioning mechanism has an annular seat formed on an outer periphery of the barrel at a base end and the locking member capable of resting on the seat.

(e) Pairs of first and second engaging protrusions are provided each symmetrically about a central axis of the barrel, and a pair of first movable article side engaging protrusions corresponding to the pair of first engaging protrusions and a pair of second movable article side engaging protrusions corresponding to the pair of second engaging protrusions are provided; and the unilateral side surfaces of the pairs of first and second engaging protrusions each is formed to be an inclined surface, and each of the unilateral side surfaces of the pairs of first and second movable article side engaging protrusions, which are capable of abutting the unilateral side surfaces of the pairs of first and second engaging protrusions, is formed to be an inclined surface.

(f) The pair of inclined surfaces of the pair of first movable article side engaging protrusions is on parallel lines spaced at a specific distance in a bottom view and the pair of inclined surfaces of the pair of second movable article side engaging protrusions is on parallel lines spaced at a specific distance in a bottom view.

(g) The pair of inclined surfaces of the pair of first engaging protrusions is on parallel lines spaced at a specific distance in a plane view and the pair of inclined surfaces of the pair of second engaging protrusions is on parallel lines spaced at a specific distance in a plane view.

(h) The movable article is a pallet for immobilizing a work piece to be machined.

(i) The cylinder means of the clamping mechanism comprises spring members for driving the piston rod for clamping and a piston and hydraulic operation chamber for unclamping the piston rod.

| | EXPLANATION OF NUMERALS |
|---|---|
| 1, 1A | movable article coupling apparatus |
| 2, 2A | support |
| 3, 3A | pallet (movable article) |
| 12, 42 | first engaging protrusion |
| 12a, 42a | inclined surface |
| 13, 43 | second engaging protrusion |
| 32, 52 | first movable article side engaging protrusion |
| 32a, 52a | inclined surface |
| 33, 53 | second movable article side engaging protrusion |
| 33a, 53a | inclined surface |
| 7 | clamping mechanism |
| 8 | Z direction positioning mechanism |
| 10 | barrel |
| 11 | seat |
| 14 | cylinder mechanism |
| 19 | piston member |
| 20 | piston rod |
| 21 | hydraulic chamber |
| 22 | a stack of disc springs |
| 26 | steel ball |
| 27 | recess |
| 34 | locking member |
| 34a | seating surface |

DETAILED DESCRIPTION OF THE PREFERRED EMBODIMENTS

The present invention relates to a movable article coupling apparatus for bringing a movable article near to a base side support from above, positioning it in the horizontal X, Y directions and in the vertical Z direction, and clamping it in a releasable manner. This coupling apparatus is characterized by comprising a first engaging protrusion and a second engaging protrusion formed on the top surface of the support for positing in the X direction and in the Y direction, respectively; and a first engaging part and a second engaging part provided on the bottom surface of the movable article and capable of abutting unilateral side surfaces of the first and second engaging protrusions, respectively.

It is preferable that the first engaging part consists of a first movable article side engaging protrusion and the second engaging part consists of a second movable article side engaging protrusion.

Embodiment 1

A movable article coupling apparatus 1 of this embodiment is an apparatus for horizontally and vertically positioning and clamping a pallet 3 (a movable article) to which a work piece to be machined is attached, on a support 2 of a machining tool.

The coupling apparatus 1 is described with reference to FIGS. 1 to 11.

Figure 1:
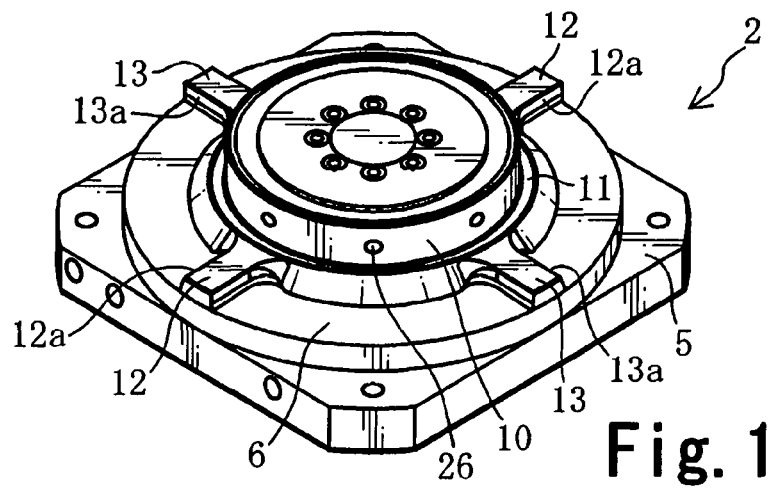
FIG. 1 is a perspective view of the support of the coupling apparatus in Embodiment 1.

The base side support 2 shown in FIG. 1 is immobilized, for example, on the table of a machining tool. The pallet 3 shown in FIG. 4 in the inverted position is detachably mounted on the support 2 with a work piece attached on the top surface.

Figure 2:
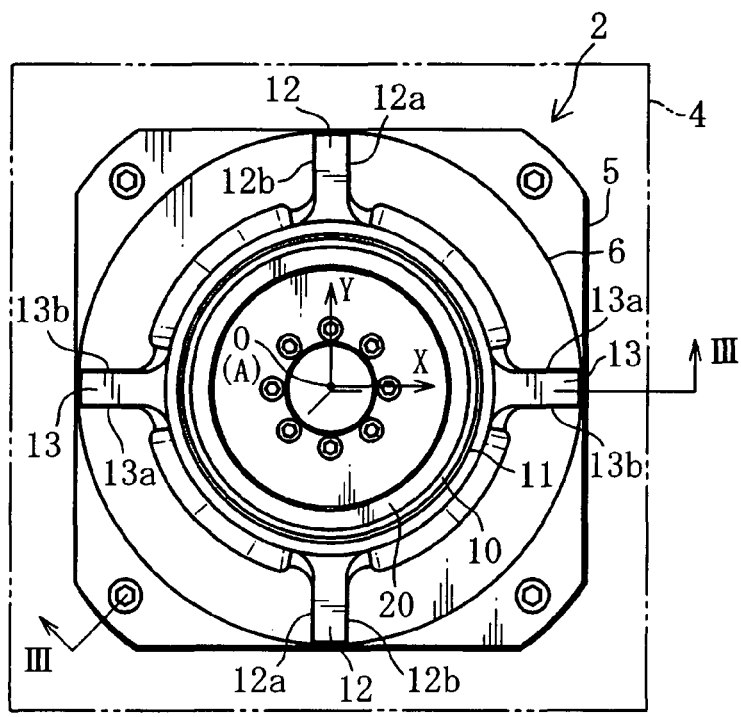
FIG. 2 is a plan view of the support.
Figure 3:
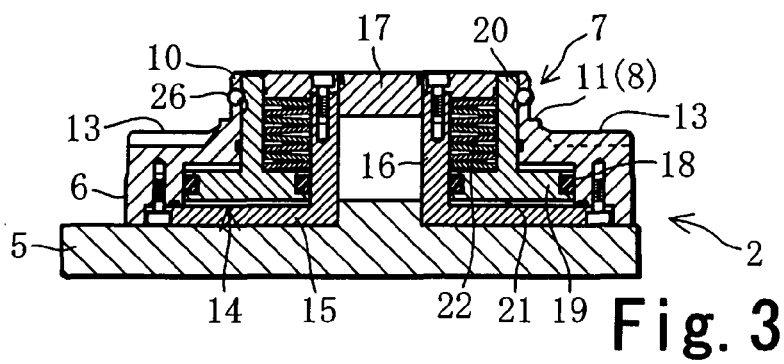
FIG. 3 is a cross-sectional view at the line III-III in FIG. 2.
Figure 4:
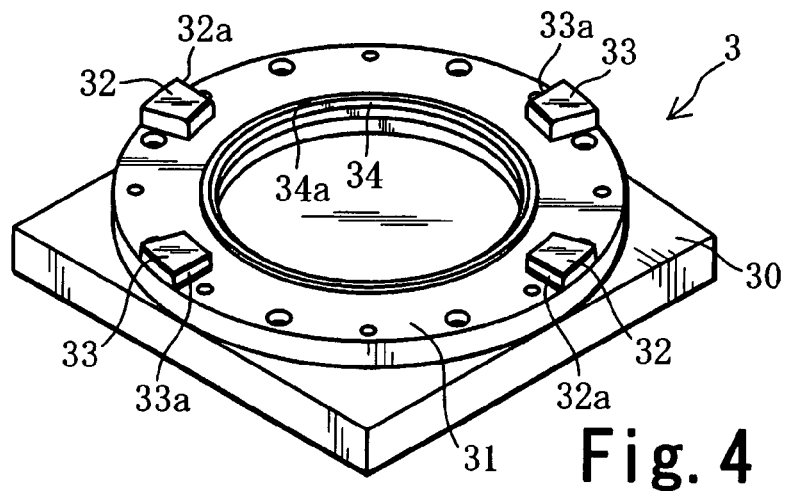
FIG. 4 is a perspective view of the pallet in the inverted position.

As shown in FIGS. 1 to 3, the support 2 comprises a base plate 5 immobilized on the machining tool table 4 or an equivalent thick plate member, a round clamping main body 6, a clamping mechanism 7 built in the clamping main body 6, and a Z direction positioning mechanism 8.

The clamping main body 6 has a barrel 10 integrally formed therewith. On the outer periphery of the barrel 10 at the base provided is a seat 11 of the Z direction positioning mechanism 8 for receiving and positioning in the Z direction the bottom end of an annular locking member 34 of the pallet 3. As shown in FIG. 2, an XYZ coordination system is assumed having the origin O on the central axis A of the barrel 10 of the clamping main body 6, the axis X extending right and left, the axis Y extending up and down in FIG. 2, and the axis Z extending in the vertical direction.

A pair of first engaging protrusions 12, 12 for positioning in the X direction and a pair of second engaging protrusions 13, 13 for positioning in the Y direction are formed on the top surface of the clamping main body 6 of the support 2. The pairs of first and second engaging protrusions 12, 12 and 13, 13 are arranged in the shape of a cross on the top surface of the clamping main body 6. The pair of first engaging protrusions 12, 12 is arranged symmetrically about the central axis A and the pair of second engaging protrusions 13, 13 is arranged symmetrically about the central axis A.

Figures 10, 11:
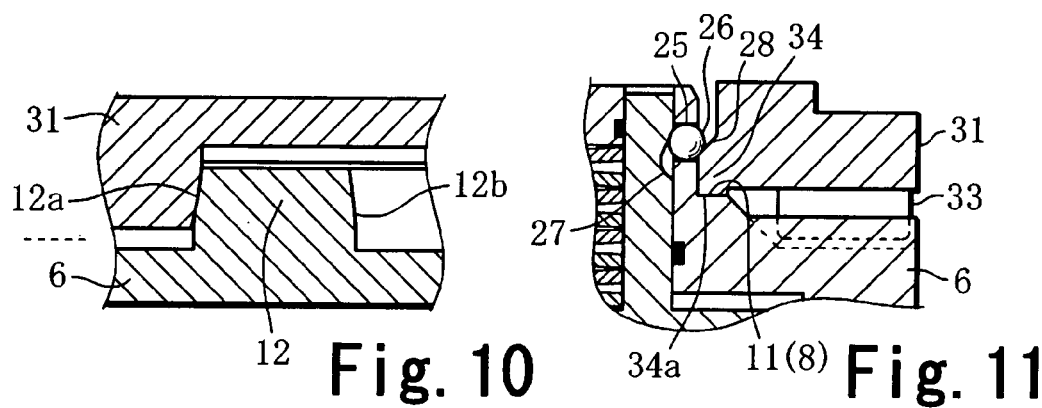
FIG. 10 is a vertical cross-sectional view of the engaging protrusion and movable article engaging protrusion.
FIG. 11 is an enlarged vertical cross-sectional view of the core part of the clamping mechanism.

As shown in FIG. 10, the first engaging protrusions 12, 12 are nearly trapezoidal in cross-section, having on either side inclined surfaces 12a and 12b with an inclination of approximately 8 to 15 degrees relative to the vertical direction. One inclined surface 12a of each of the pair of first engaging protrusions 12, 12 is used to position the pallet 3 in the X direction. One of the pair of inclined surfaces 12a, 12a is formed on the +X direction side and the other is formed on the −X direction side.

The second engaging protrusions 13, 13 are similar to the first engaging protrusions 12, 12. The second engaging protrusions 13, 13 are nearly trapezoidal in cross-section, having on either side inclined surfaces 13a and 13b similar to the above described. One inclined surface 13a of each of the second engaging protrusions 13, 13 is used to position the pallet 3 in the Y direction. One of the pair of inclined surfaces 13a, 13a is formed on the +Y direction side and the other is formed on the −Y direction side.

The first and second engaging protrusions 12 and 13 serve to prevent the relative rotation of the pallet 3 to the support 2. To this end, the inclined surface 12a of each first engaging protrusion 12 is formed on the front side in the clockwise rotation while the inclined surface 13a of each second engaging protrusion 13 is formed on the front side in the anti-clockwise rotation in the plan view of FIG. 2.

As shown in FIGS. 4 to 7, the pallet 3 (movable article) has a square pallet body 30 and an annular locating ring 31 immobilized on the bottom surface of the pallet body 30 by bolts. A pair of first movable article side engaging protrusions 32, 32 for positioning in the X direction (these are equivalent to the engaging parts) and a pair of second movable article side engaging protrusions 33, 33 for positioning in the Y direction (these are equivalent to the engaging parts) protrude below the bottom surface of the locating ring 31. An annular locking member 34 capable of fitting on the barrel 10 of the clamping main body 6 is integrally formed on the inner periphery of the locating ring 31.

The pair of first movable article side engaging protrusions 32, 32 is arranged symmetrically about the central axis A and the pair of second movable article side engaging protrusions 33, 33 is arranged symmetrically about the central axis A. The pair of first movable article side engaging protrusions 32, 32 has positioning inclined surfaces 32a, 32a that are closely engaged with the positioning inclined surfaces 12a, 12a of the pair of first engaging protrusions 12, 12 from above and the pair of second movable article side engaging protrusions 33, 33 has positioning inclined surfaces 33a, 33a that are closely engaged with the positioning inclined surfaces 13a, 13a of the pair of second engaging protrusions 13, 13 from above.

One of the pair of inclined surfaces 32a, 32a is formed on the +X direction side and the other is formed on the −X direction side. One of the pair of inclined surfaces 33a, 33a is formed on the +Y direction side and the other is formed on the −Y direction side.

Figure 5:
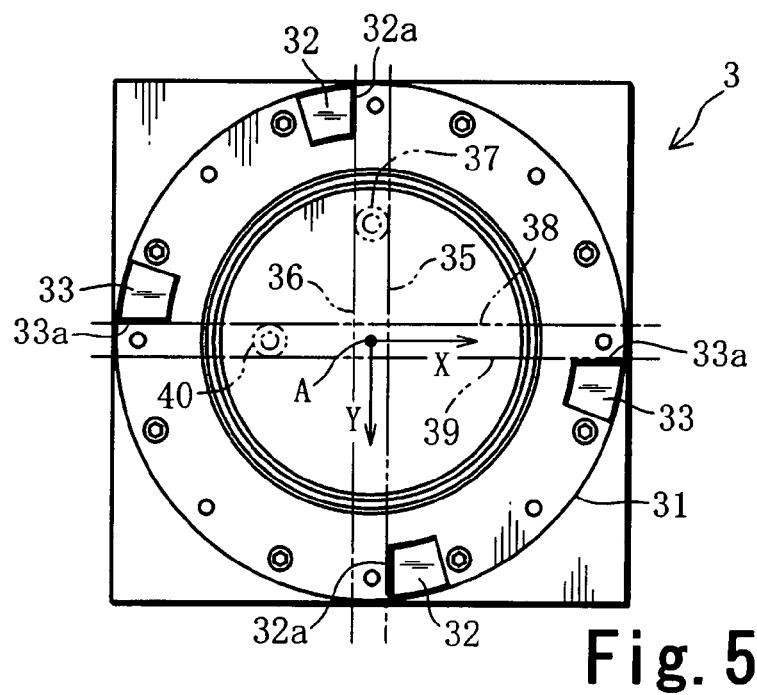
FIG. 5 is a bottom view of the pallet.
Figure 6:
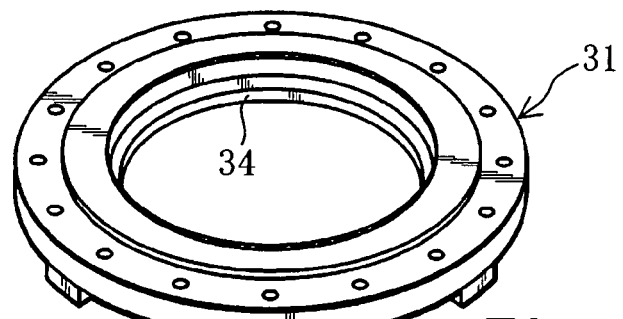
FIG. 6 is a perspective view of the locating ring of the pallet.
Figure 7:
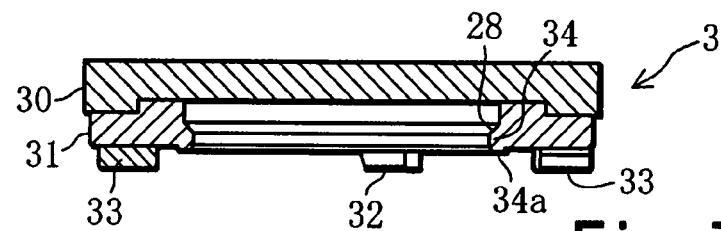
FIG. 7 is a vertical cross-sectional view of the pallet.

In order to prevent the relative rotation of the pallet 3 to the support 2, the inclined surface 32a of each first movable article side engaging protrusion 32 is formed on the front side in the clockwise rotation while the inclined surface 33a of each second movable article side engaging protrusion 33 is formed on the front side in the anti-clockwise rotation in the bottom view of FIG. 5. Meanwhile, the inclined surface 32a of each first movable article side engaging protrusion 32 is formed on the front side in the anti-clockwise rotation while the inclined surface 33a of each second movable article side engaging protrusion 33 is formed on the front side in the clockwise rotation in the plan view.

As shown in FIG. 5, the pair of inclined surfaces 32a, 32a of the pair of first movable article side engaging protrusions 32, 32 is on parallel lines 35 and 36 spaced at a specific distance in the bottom view. In order to form the pair of inclined surfaces 32a, 32a arranged in this way by abrasion (polishing) using an abrasive tool 37 in the course of producing the pallet 3, the locating ring 31 and abrasive tool 37 are linearly and relatively moved while the abrasive tool 37 is moved along the parallel lines 35 and 36, whereby the pair of inclined surfaces 32a, 32a can be abraded. In this way, the abrasion accuracy can be remarkably improved. For the same reason as above, the pair of inclined surfaces 33a, 33a of the pair of second movable article side engaging protrusions 33, 33 is on parallel lines 38 and 39 spaced at a specific distance in the bottom view and these inclined surfaces 33a, 33a can be abraded with an abrasive tool 40 with high accuracy.

The Z direction positioning mechanism 8 is used to position the pallet 3 relative to the support 2 in the Z direction (the vertical direction) and comprises a seat 11 and the locking member 34 of the locating ring 31.

The clamping mechanism 7 for locking the pallet 3 on the support 2 in a releasable manner is described with reference to FIGS. 3, 8, 9, and 11.

The clamping mechanism 7 comprises the barrel 10 of the clamping main body 6, a cylinder mechanism 14 (cylinder means) built in the support 2, multiple steel balls 15, and the locking member 34 of the pallet 3. The clamping main body 6 is also provided with an inner barrel 16 integrated with a bottom plate 15 for forming the annular cylinder mechanism 14 and a cover 17.

Figure 8:
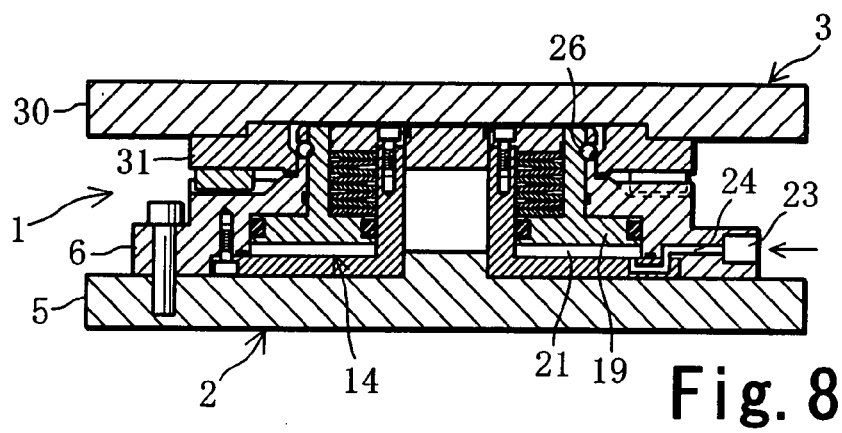
FIG. 8 is a vertical cross-sectional view of the support and the pallet before locked.
Figure 9:
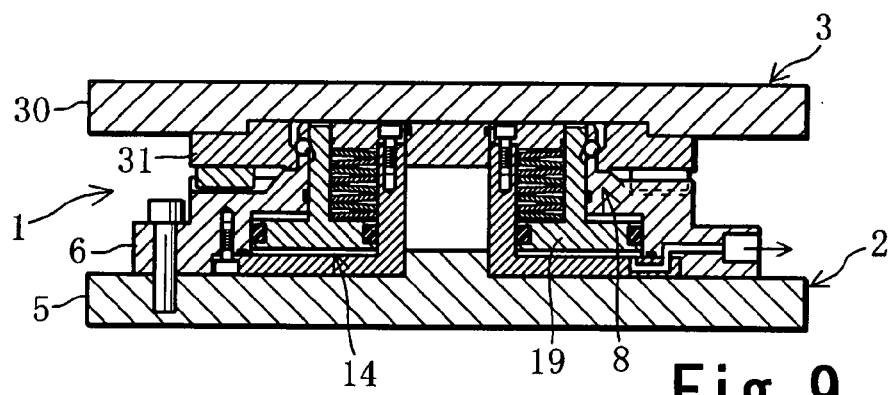
FIG. 9 is a vertical cross-sectional view of the support and the pallet after locked.

As shown in FIG. 3, the cylinder mechanism 14 has an annular cylinder bore 18 formed in the clamping main body 6, an annular piston member 19 fitted in the cylinder bore 18 and an annular piston rod 20 thereof, a hydraulic chamber 21 (hydraulic operation chamber) formed under the piston member 19, a stack of multiple disc springs 22 for powerfully driving the piston member 19 downward for clamping, and a hydraulic port 23 and oil passage 24 connected to an external hydraulic supply source (see FIGS. 8 and 9). The piston rod 20 is slidably fitted in the barrel 10.

The multiple steel balls 26 are radially movably retained in multiple retention holes 25 formed in the peripheral wall of the barrel 10. Multiple recesses 27 are formed on the outer periphery of the piston rod 20, in which the multiple steel balls 26 can be partially retracted. An inclined part extends from each recess 27 to the outer periphery of the piston rod 20, gradually becoming shallower as it goes up.

As shown in FIG. 11, an annular seating surface 34*a* formed at the bottom end of the locking member 34 of the locating ring 31 rests on the seat 11. The locking member 34 has an annular and partially cone-shaped locking surface 28, which is pressed by the multiple steel balls 26 from above.

Operation and effects of the above described coupling apparatus 1 are described hereafter.

For machining a work piece attached to the pallet 3, the hydraulic chamber 21 of the cylinder mechanism 14 of the support 2 is hydraulically activated to hold the piston member 19 at an upper position. The pallet 3 with the work piece attached thereto is placed over the support 2. The central axis A of the pallet 3 is aligned with the central axis A of the support 2 and their orientations in the X, Y directions are matched. Then, the pallet 3 is lowered to be near to the support 2. While the pallet 3 is supported by the top end of the piston rod 20, the inclined surfaces 32*a*, 32*a* of the pair of first movable article side engaging protrusions 32, 32 of the pallet 3 abut the inclined surfaces 12*a*, 12*a* of the pair of first engaging protrusions 12, 12 of the support 2 and the inclined surfaces 33*a*, 33*a* of the pair of second movable article side engaging protrusions 33, 33 of the pallet 3 abut the inclined surfaces 13*a*, 13*a* of the pair of second engaging protrusions 13, 13 of the support 2 (see FIG. 8).

In this state, the pallet 3 is positioned in the X, Y directions with high accuracy. Then, the hydraulic chamber 21 of the cylinder mechanism 14 is hydraulically deactivated, whereby the piston member 19 is lowered under elastic force of the stack of disc springs 22. The pallet 3 is lowered as the piston member 19 is lowered. The lowered piston member 19 pushes the multiple steel balls 16 out from the barrel 10 and, subsequently, the multiple steel balls 16 press the annular locking surface 28 downward. Then, the annular seating surface 34*a* is pressed against the seat 11 and the pallet 3 is positioned relative to the support 2 in the Z direction with high accuracy. The pallet 3 is clamped on the support 2 (see FIG. 9).

In the coupling apparatus 1, the first and second engaging protrusions 12 and 13 are not engaged with engaging grooves. Instead, the first and second engaging protrusions 12 and 13 and first and second movable article side engaging protrusions 32 and 33 are used for positioning in the X, Y directions. There is no engaging grooves in which cutting dust easily adheres and accumulates. Only the engaging protrusions are provided, which facilitates cleaning off cutting dust, for example, by air blowing.

Furthermore, unilateral inclined surface 32*a* of the pair of first movable article side engaging protrusions 32 is engaged with the unilateral inclined surface 12*a* on the pair of first engaging protrusions 12 for positioning in the X direction and unilateral inclined surface 33*a* of the pair of second movable article side engaging protrusions 33 is engaged with the unilateral inclined surface 13*a* of the pair of first engaging protrusions 13 for positing in the Y direction. Area contact is made between the inclined surfaces at four points for positioning in the X, Y directions. In this way, the number of entry points of cutting dust is significantly reduced. Therefore, possible entry of cutting dust is reduced and fewer problems resulting from entry of cutting dust will occur.

The inclined surfaces 32*a*, 32*a* of the first movable article engaging protrusions 32, 32 on the pallet 3 are on the parallel lines 35 and 36 spaced at a specific distance in the bottom view. As described above, the inclined surfaces 32*a*, 32*a* can be abraded with high accuracy, thereby improving the positioning accuracy in the direction X. This is similarly true for the inclined surfaces 33*a*, 33*a* of the second movable article engaging protrusions 33, 33.

The first and second engaging protrusions 12 and 13 and first and second movable article side engaging protrusions 32 and 33 have no elastic walls that are elastically deformed to absorb errors. Therefore, there is no reduction in the cutting accuracy resulting from the elastic wall elastically deformed by a cutting force applied from the work piece during the machining of a work piece. The work piece can be machined with high accuracy.

Embodiment 2

A movable article coupling apparatus 1A of this embodiment is an apparatus for horizontally and vertically positioning and clamping a pallet 3A (the movable article) to which a work piece to be machined is attached on a machining tool support 2A as in the coupling apparatus 1 of Embodiment 1.

The coupling apparatus 1A is described with reference to FIGS. 12 to 21. However, the coupling apparatus 1A has the same structure as the coupling apparatus 1 of Embodiment 1 except that the engaging protrusions on the support 2A and the movable article side engaging protrusions on the pallet 3A have different structures from those of the coupling apparatus 1. The same components are given the same reference numbers as those of the coupling apparatus 1 and their explanation is omitted.

Figure 12:
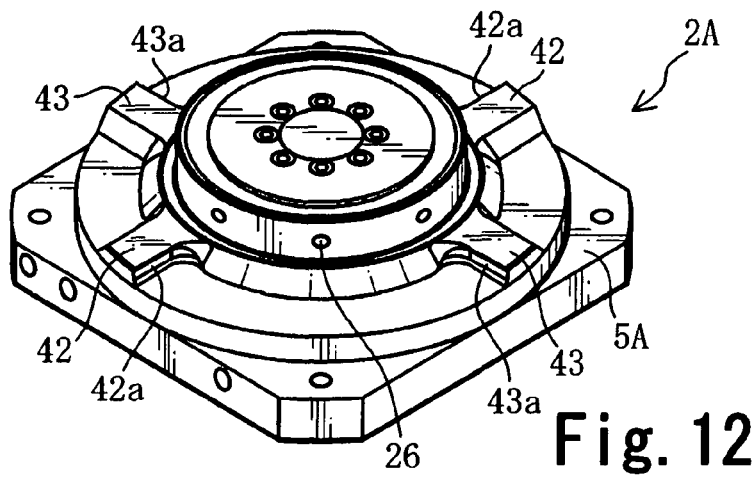
FIG. 12 is a perspective view of the support of the coupling apparatus in Embodiment 2.

The support 2A is briefly described with reference to FIGS. 12 to 14.

The support 2A comprises a base plate 5A immobilized on a machining tool table 4, a clamping main body 6A, a clamping mechanism 7 built in the clamping main body 6A, and a Z direction positioning mechanism 8. The clamping main body 6A has a barrel 10 and a seat 11 of the Z direction positioning mechanism 8. As shown in FIG. 13, the same XYZ coordinate system as in Embodiment 1 is used for explanation.

A pair of first engaging protrusions 42, 42 for positioning in the X direction and a pair of second engaging protrusions 43, 43 for positioning in the Y direction are formed on the top surface of the clamping main body 6A of the support 2A. The pairs of first and second engaging protrusions 42, 42 and 43, 43 are arranged on the top surface of the clamping main body 6 in the shape of a cross. The pair of first engaging protrusions 42, 42 is arranged symmetrically about the central axis A and the pair of second engaging protrusions 43, 43 is arranged symmetrically about the central axis A.

The first engaging protrusions 42, 42 are inequilateral trapezoidal in cross-section, which is not shown in the figures. An inclined surface 42a is formed on unilateral side of each of the first engaging protrusions 42, 42 at an inclination of 8 to 15 degrees relative to the vertical direction. One inclined surface 42a of each of the pair of first engaging protrusions 42, 42 is used to position the pallet 3 in the X direction. One of the pair of inclined surfaces 42a, 42a is formed on the +X direction side and the other is formed on the −X direction side.

The second engaging protrusions 43, 43 are similar to the first engaging protrusions 42, 42. The second engaging protrusions 43, 43 are inequilateral trapezoidal in cross-section. An inclined surface 43a is formed on unilateral side of each of the second engaging protrusions 43, 43 at a similar angle to the above. One inclined surface 43a of each of the pair of second engaging protrusions 43, 43 is used to position the pallet 3 in the Y direction. One of the pair of inclined surfaces 43a, 43a is formed on the +Y direction side and the other is formed on the −Y direction side.

Figure 13:
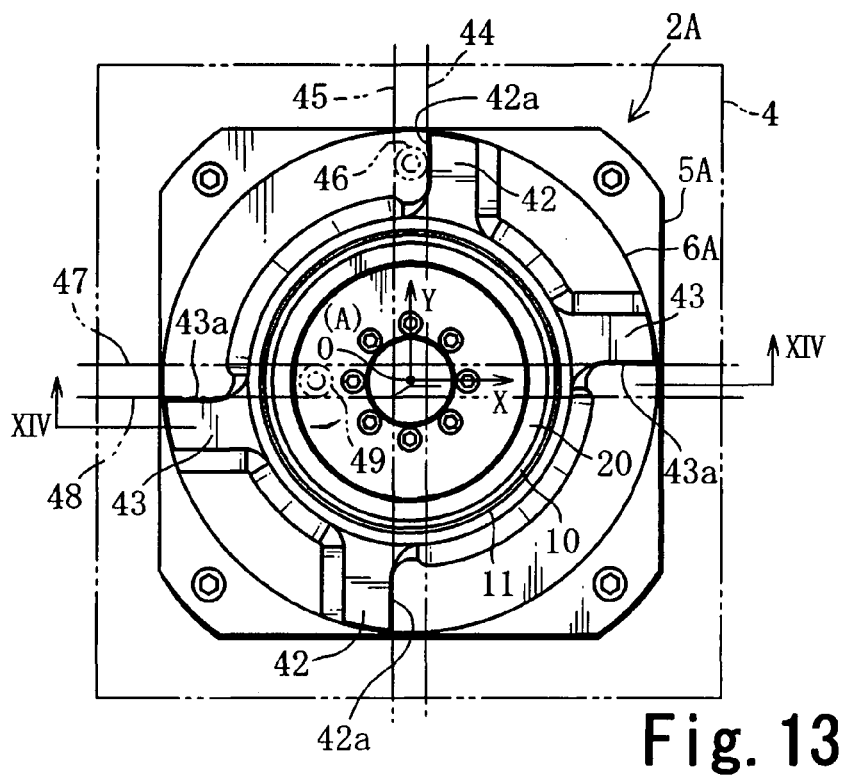
FIG. 13 is a plan view of the support.
Figure 14:
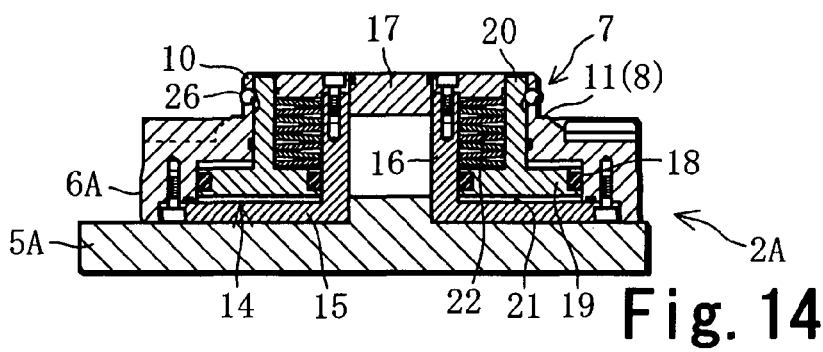
FIG. 14 is a cross-sectional view at the line XIV-XIV in FIG. 13.
Figure 15:
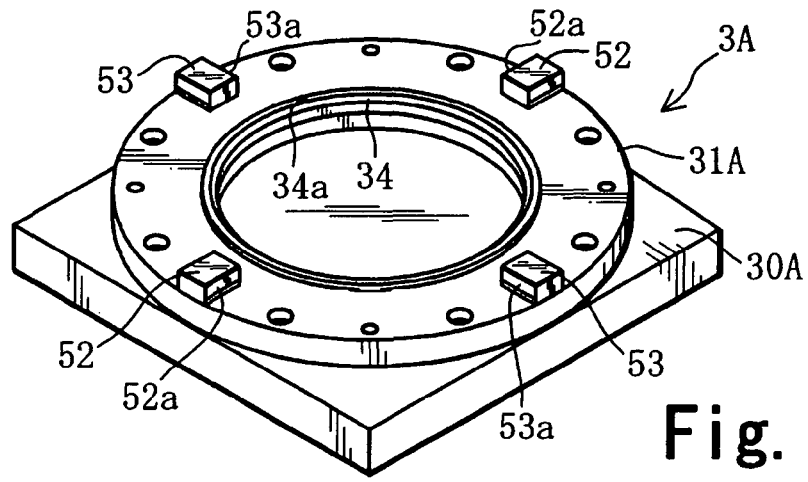
FIG. 15 is a perspective view of the pallet in the inverted position.
Figure 16:
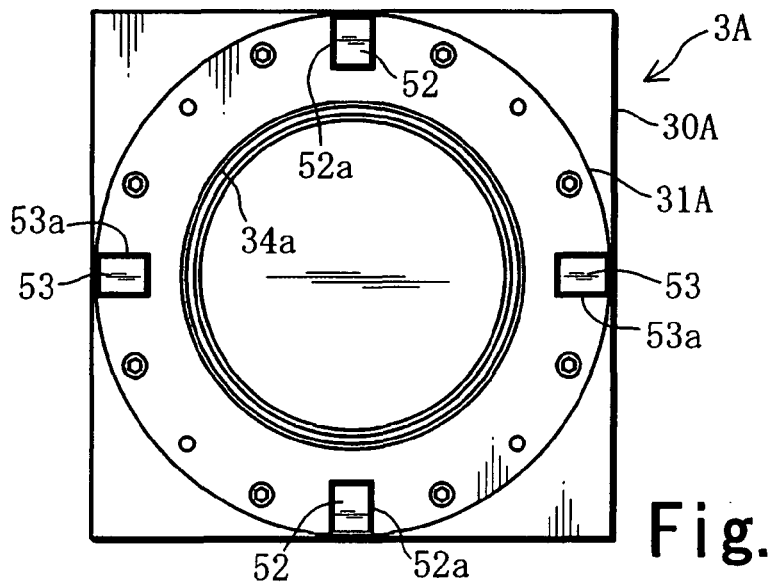
FIG. 16 is a bottom view of the pallet.
Figure 17:
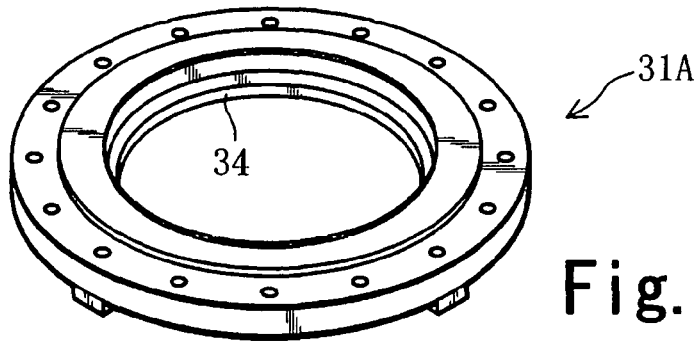
FIG. 17 is a perspective view of the locating ring of the pallet.
Figure 18:
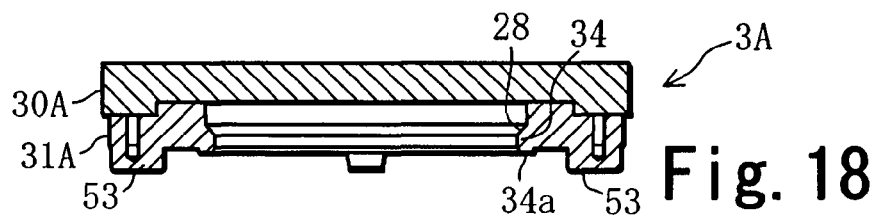
FIG. 18 is a vertically cross-sectional view of the pallet.
Figure 19:
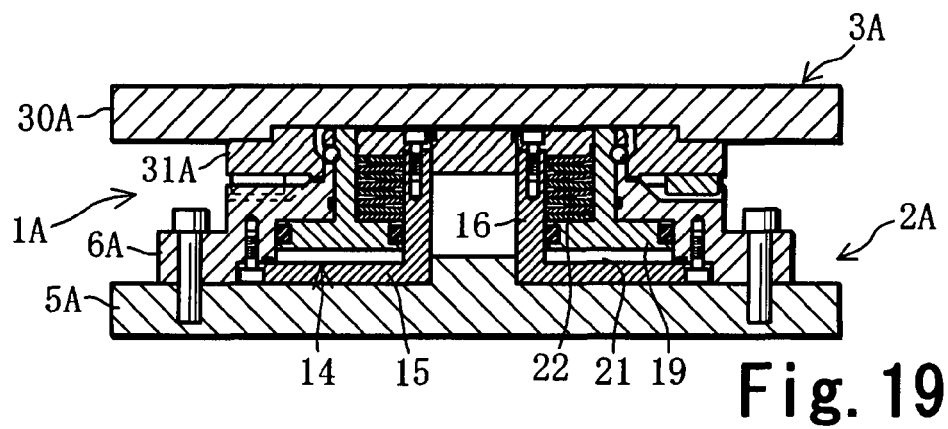
FIG. 19 is a vertically cross-sectional view of the support and the pallet before locked.
Figure 20:
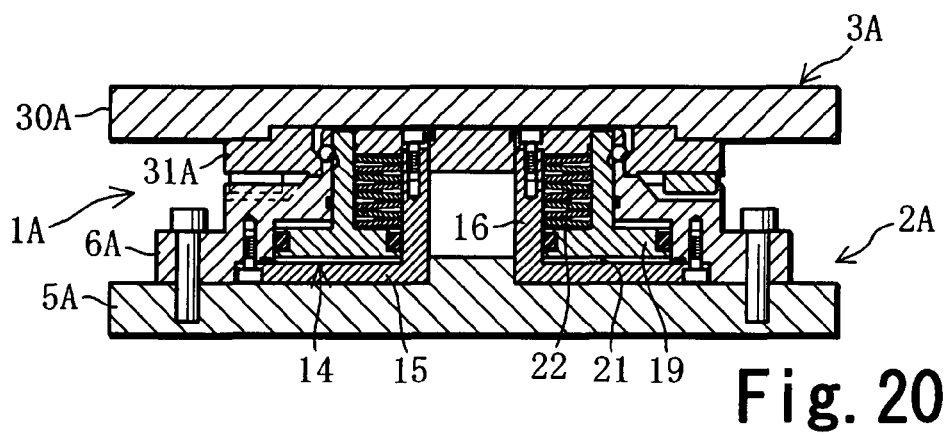
FIG. 20 is a vertically cross-sectional view of the support and the pallet after locked.
Figure 21:
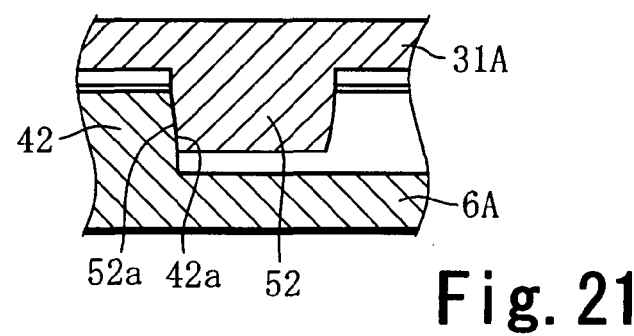
FIG. 21 is a vertically cross-sectional view of the engaging protrusion and movable article side engaging protrusion.

In order to prevent the relative rotation of the pallet 3A to the support 2A, the inclined surface 42a of each first engaging protrude 42 is formed on the front surface in the anti-clockwise rotation while the inclined surface 43a of each second engaging protrude 43 is formed on the front surface in the clockwise rotation in the plan view of FIG. 13.

As shown in FIG. 13, the pair of inclined surfaces 42a, 42a of the pair of first engaging protrusions 42, 42 are on parallel lines 44 and 45 spaced at a specific distance in the plan view. In order to form a pair of inclined surface arranged in this way by abrasion using an abrasive tool 46, the support 2A and abrasive tool 46 are linearly and relatively moved while the abrasive tool 46 is moved along the parallel lines 44 and 45, whereby the pair of inclined surfaces 42a, 42a can be abraded. In this way, the abrasion accuracy can be remarkably improved.

For the same reason as above, the pair of inclined surfaces 43a, 43a of the pair of second engaging protrusions 43, 43 is arranged on parallel lines 47 and 48 spaced at a specific distance in the plan view and these inclined surfaces 43a, 43a can be abraded with an abrasive tool 49 with high accuracy. The support 2A has the clamping mechanism 7 and Z direction positioning mechanism 8 in the same manner as the support 2 of Embodiment 1 and their explanation is omitted.

As shown in FIGS. 15 to 18, the pallet 3A (movable article) has a pallet body 30A and an annular locating ring 31A immobilized on the bottom surface of the pallet body 30A. A pair of first movable article side engaging protrusions 52, 52 for positioning in the X direction (these are equivalent to the engaging parts) and a pair of second movable article side engaging protrusions 53, 53 for positioning in the Y direction (these are equivalent to the engaging parts) protrude below the bottom surface of the locating ring 31A. An annular locking member 34 capable of fitting on the barrel 10 of the clamping main body 6A is integrally formed on the inner periphery of the locating ring 31A.

The pair of first movable article side engaging protrusions 52, 52 is arranged symmetrically about the central axis A and the pair of second movable article side engaging protrusions 53, 53 is arranged symmetrically about the central axis A. The pair of first movable article side engaging protrusions 52, 52 has positioning inclined surfaces 52a, 52a that are closely engaged with the positioning inclined surfaces 42a, 42a of the pair of first engaging protrusions 42, 42 from above and the pair of second movable article side engaging protrusions 53, 53 has positioning inclined surfaces 53a, 53a that are closely engaged with the positioning inclined surfaces 43a, 43a of the pair of second engaging protrusions 43, 43 from above.

One of the pair of inclined surfaces 52a, 52a is formed on the +X direction side and the other is formed on the −X direction side. In order to prevent the relative rotation of the pallet 3A to the support 2A, the inclined surface 52a of each first movable article side engaging protrusion 52 is formed on the front side in the anti-clockwise rotation while the inclined surface 53a of each second movable article side engaging protrusion 53 is formed on the front side in the clockwise rotation in the bottom view of FIG. 16.

For positioning the pallet 3A relative to the support 2A in the X, Y, Z directions using the coupling apparatus 1A, the inclined surfaces 52a of the pair of first movable article side engaging protrusions 52, 52 are area-contacted with the inclined surfaces 43a of the pair of first engaging parts 43, 43 for positioning in the X direction and the inclined surfaces 53a of the pair of second movable article side engaging protrusions 53, 53 are area-contacted with the inclined surfaces 43a of the pair of second engaging parts 43, 43 for positioning in the Y direction. The pallet 3A is drawn to the support 2A by the clamping mechanism 7 and the seating surface 34a of the locking member 34 is pressed against the seat 11 of the clamping main body 6A for positioning in the Z direction and locked. Other operations and effects are the same as those of the coupling apparatus 1 and their explanation is omitted.

Partial modifications to Embodiments 1 and 2 are described hereafter.

(1) The Z direction positioning mechanism 7 is not restricted to those in the above embodiments. For example, the bottom surface of the locating ring 31 or 31A of the pallet 3 or 3A can rest on multiple seats in the form of projections provided on the top surface of the clamping main body 6 or 6A along the periphery at proper intervals.

(2) The locking surface of the locking member of the pallet can have recesses at positions corresponding to the steel balls so that the steel balls are pressed in the recesses.

(3) The movable article coupling apparatus of the present invention is applicable to apparatuses that are not for positioning and locking a pallet. The present invention can be implemented by those skilled the field with various modification added without departing from the scope of the present invention.

INDUSTRIAL APPLICABILITY

The present invention is applicable to an apparatus for positioning and locking a pallet on which a work piece to be machined is immobilized relative to a machining tool table and to other apparatuses.

What is claimed is:

1. A movable article coupling apparatus for bringing a movable article near to a base side support from above, positioning the movable article in horizontal X, Y directions and in a vertical Z direction, and clamping the movable article in a releasable manner, comprising:
a clamping mechanism including a clamping main body;
a barrel protruding above said clamping main body;
a first pair of first engaging protrusions and a second pair of second engaging protrusions being formed on a top surface of said clamping main body around said barrel for positioning in the X direction and in the Y direction, respectively, said first and second pairs of said first and second engaging protrusions each being arranged symmetrically about a central axis of said barrel;
a first engaging part and a second engaging part being provided on a bottom surface of said movable article and being capable of abutting unilateral side surfaces of said first and second engaging protrusions, respectively;
said first engagement part including a pair of first movable article side engaging protrusions corresponding to said pair of first engaging protrusions and said second engagement part including a pair of second movable article side engaging protrusions corresponding to said pair of second engaging protrusions; and each of said unilateral side surfaces of said pairs of first and second engaging protrusions is formed to be an inclined surface, and each of said unilateral side surfaces of said pairs of first and second movable article side engaging protrusions, which are capable of abutting said unilateral side surfaces of said pairs of first and second engaging protrusions, is formed to be an inclined surface.

2. The movable article coupling apparatus according to claim 1, wherein said pair of inclined surfaces of said pair of first movable article side engaging protrusions is on parallel lines spaced at a specific distance in a bottom view and said pair of inclined surfaces of said pair of second movable article side engaging protrusions is on parallel lines spaced at a specific distance in a bottom view.

3. The movable article coupling apparatus according to claim 1, wherein said pair of inclined surfaces of said pair of first engaging protrusions are on parallel lines spaced at a specific distance in a plan view and said pair of inclined surfaces of said pair of second engaging protrusions is on parallel lines spaced at a specific distance in a plan view.

4. The movable article coupling apparatus according to claim 1, further comprising a Z direction positioning mechanism for positioning said movable article relative to said support in the Z direction.

5. The movable article coupling apparatus according to claim 4, further comprising:

a cylinder including a piston rod slidably fitted in said barrel of said clamping mechanism;

an annular locking member formed at a bottom end of said movable article and capable of being fitted on said barrel;

multiple steel balls radially movably retained in multiple retention holes formed in a peripheral wall of said barrel; and multiple recesses formed on an outer periphery of said piston rod to partially retract said multiple steel balls therein.

6. The movable article coupling apparatus according to claim 5, wherein:

said Z direction positioning mechanism includes an annular seat formed on an outer periphery of said barrel at a base end; and said locking member is capable of resting on said seat.

7. The movable article coupling apparatus according to claim 5, wherein said cylinder of said clamping mechanism comprises spring members for driving said piston rod for clamping and a piston and hydraulic operation chamber for unclamping said piston rod.

8. The movable article coupling apparatus according to claim 1, wherein said movable article is a pallet for immobilizing a work piece to be machined.

* * * * *